(12) United States Patent
Christmann et al.

(10) Patent No.: US 9,893,513 B2
(45) Date of Patent: Feb. 13, 2018

(54) FUSE ELEMENT

(71) Applicant: SIEMENS AKTIENGESELLSCHAFT, Munich (DE)

(72) Inventors: Jean Marc Christmann, Nuremberg (DE); Werner Hartmann, Weisendorf (DE); Sergio Yamazaki, Guarulhos (BR)

(73) Assignee: Siemens Aktiengesellschaft, Munich (DE)

( * ) Notice: Subject to any disclaimer, the term of this patent is extended or adjusted under 35 U.S.C. 154(b) by 457 days.

(21) Appl. No.: 14/423,544

(22) PCT Filed: Aug. 20, 2013

(86) PCT No.: PCT/EP2013/067268
§ 371 (c)(1),
(2) Date: Feb. 24, 2015

(87) PCT Pub. No.: WO2014/029751
PCT Pub. Date: Feb. 27, 2014

(65) Prior Publication Data
US 2015/0188310 A1 Jul. 2, 2015

(30) Foreign Application Priority Data
Aug. 24, 2012 (EP) ..................................... 12181733

(51) Int. Cl.
*H02H 7/16* (2006.01)
*H01G 2/16* (2006.01)
*H01H 85/06* (2006.01)
*H01H 85/10* (2006.01)
*H01H 69/02* (2006.01)
(Continued)

(52) U.S. Cl.
CPC ................ *H02H 7/16* (2013.01); *H01G 2/16* (2013.01); *H01H 69/02* (2013.01); *H01H 85/06* (2013.01);
(Continued)

(58) Field of Classification Search
CPC .............................. H02H 7/16; H01L 2924/00
(Continued)

(56) References Cited

U.S. PATENT DOCUMENTS 2,734,111 A 2/1956 Kozacka
3,471,818 A * 10/1969 Koch ..................... H01H 85/10
337/292

(Continued)

FOREIGN PATENT DOCUMENTS

CN 101232003 A 7/2008
CN 101542670 A 9/2009
(Continued)

*Primary Examiner* — Dharti Patel
(74) *Attorney, Agent, or Firm* — Laurence Greenberg; Werner Stemer; Ralph Locher

(57) ABSTRACT

A fuse element and a method for manufacturing the same are provided whereby the fuse element contains an active response part which is formed by an elongated fuse metal strip having at least four metal sub-strips. At least two of the metal sub-strips are parallel and the sub-strips are defined by two elongated recesses within one or two elongated fuse metal strips. The two recesses are provided in serial alignment along the respective fuse metal strip having leading and trailing parts for electrical connection of each fuse element. The elongated fuse metal strip can be reinforced by an elongated dielectric base layer made of polymer material. Accordingly, performance of such a fuse element can be increased and manufacturing costs can be decreased. The fuse element can be applied to a plurality of capacitor sub-units being integrated in housings and submerged in a cooling and insulating liquid within the housing.

11 Claims, 5 Drawing Sheets

(51) Int. Cl.
*H01H 85/12* (2006.01)
*H01G 4/38* (2006.01)

(52) U.S. Cl.
CPC ............ *H01H 85/10* (2013.01); *H01H 85/12* (2013.01); *H01G 4/38* (2013.01); *Y10T 29/49107* (2015.01)

(58) Field of Classification Search
USPC .......................................................... 361/15
See application file for complete search history.

(56) References Cited

U.S. PATENT DOCUMENTS

| | | |
|---|---|---|
| 3,648,210 A | 3/1972 | Kozacka |
| 5,805,048 A | 9/1998 | Saitoh et al. |
| 2010/0141713 A1 | 6/2010 | Hoisington et al. |
| 2010/0224955 A1 | 9/2010 | Jang |
| 2010/0245026 A1 | 9/2010 | Kobayashi et al. |
| 2012/0092123 A1 | 4/2012 | Goldstein et al. |
| 2013/0076478 A1 | 3/2013 | Christmann et al. |

FOREIGN PATENT DOCUMENTS

| | | |
|---|---|---|
| DE | 102011054485 A1 | 4/2012 |
| EP | 0762458 A1 | 3/1997 |
| EP | 2131380 A1 | 12/2009 |
| EP | 2573790 A1 | 3/2013 |
| FR | 2789514 A1 | 8/2000 |
| GB | 813643 A | 5/1959 |
| WO | 2009019903 A1 | 2/2009 |

\* cited by examiner

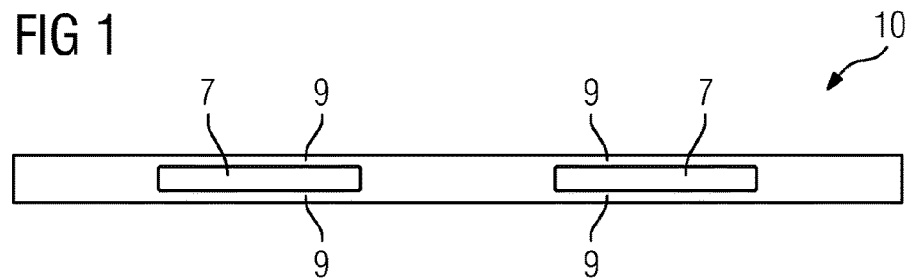
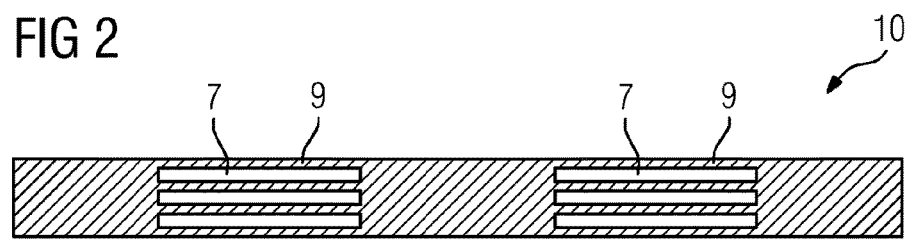
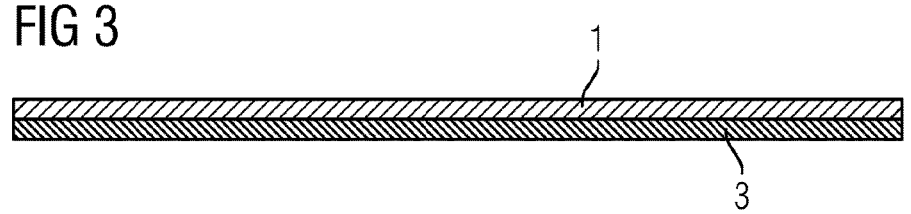
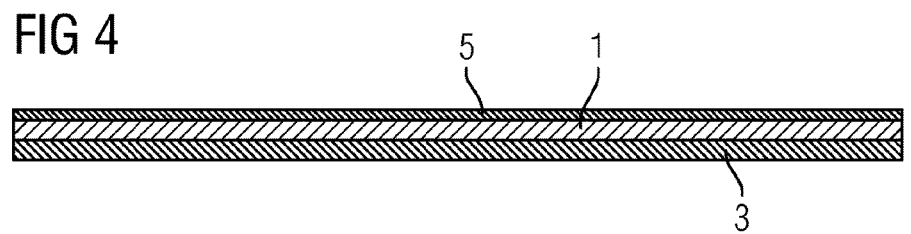

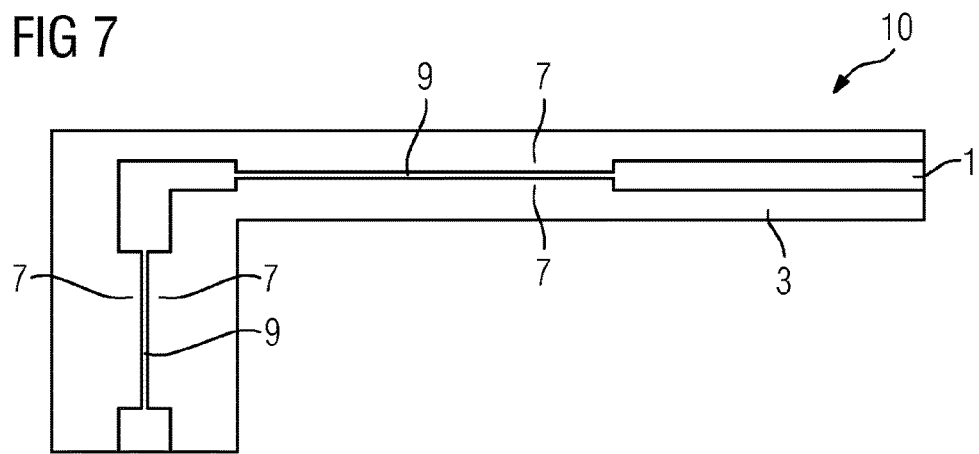
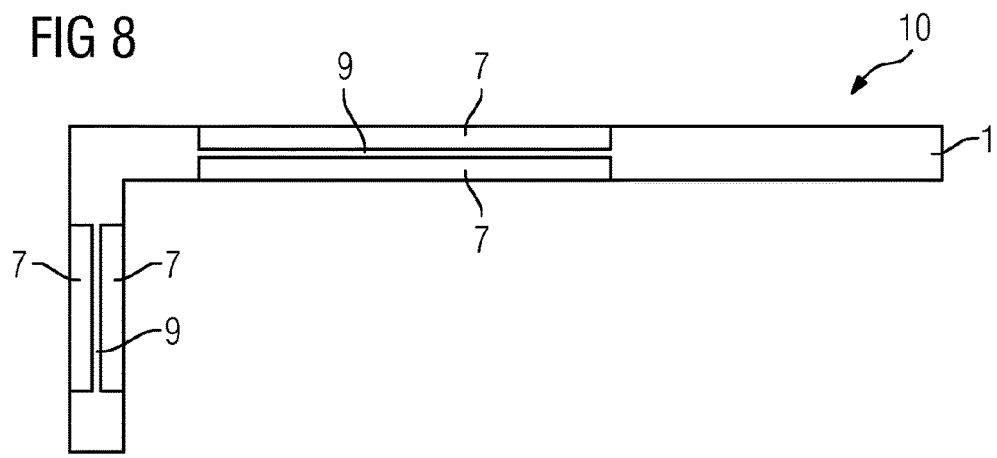
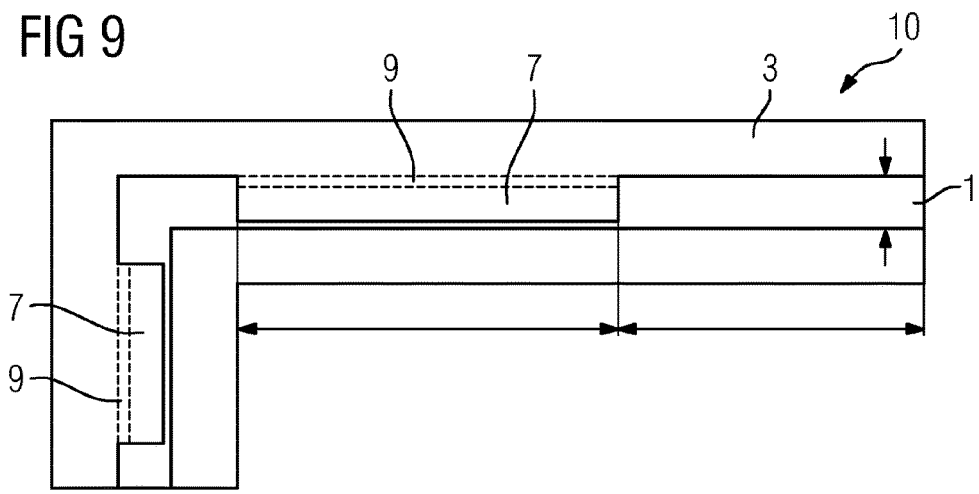

FUSE ELEMENT

BACKGROUND OF THE INVENTION

Field of the Invention:

The invention relates to a power capacitor device comprising a plurality of capacitor sub-units, whereby each capacitor sub-unit is electrically protected by an internal fuse element connected in series with the capacitor sub-unit.

The invention also relates to a high power capacitor assembled in a capacitor bank and made from a plurality of capacitor sub-units in a common housing, whereby the capacitor sub-units are electrically connected in parallel and in series circuits. Such a capacitor bank can for example be used for power factor correction systems in medium or high voltage grids.

Power factor correction systems in medium and high voltage grids need high power capacitors assembled in large capacitor banks. The individual capacitors are usually made from a plurality of smaller capacitor sub-units in a single housing. The smaller capacitor sub-units are connected in different variations of series and parallel circuits in order to meet the requirements of the specific application. If a single capacitor sub-unit fails, however, the whole capacitor assembly discharges through this sub-unit, leading to an intense arc which can even lead to a failure of the capacitor housing, to a so-called case rupture. This failure mode can then lead to a complete failure of the total capacitor bank.

As a means to increase the safety in such a capacitor bank, the individual capacitor devices can be protected by individual series fuses external from the capacitor device. This solution, however, is expensive and always leads to the complete loss of a single capacitor device, which must be exchanged as quickly as possible. In order to avoid the complete loss of a capacitor device, the individual capacitor sub-units can be protected by individual fuses inside the capacitor device. This solution has the advantage that only a single capacitor sub-unit is lost in the case of a failure, and the whole capacitor bank is not corrupted and continues to work almost undeterred.

Common technical solutions to this problem are single wire fuse elements which are connected in series with the individual capacitor sub-units. Due to the high voltages involved of several kilovolts per sub-unit, however, the fuses need to be rather long, e.g. typically 100 mm in length and more, while the diameter of the wire, which is typically a copper wire, is usually between 0.3 to 0.5 mm. In some applications, a plurality of these fuses is mounted on a single cardboard for easy handling. The individual fuse wires can also be separated from each other by paper, polymer, or ceramic hulls to avoid unintended interaction between responding and non-responding fuses in a single capacitor housing. In some products, the fuses are mounted individually on each capacitor sub-unit instead of a common board. Also known is the art to decrease the fuse resistance and, hence, part of the additional power loss, by twisting the wire at both ends of the fuse with additional wires. A further known design uses two wires in parallel in order to reduce the fuse resistance and increase the action integral $\int I^2 dt$ which must be achieved for use response, thus reducing the energy discharged into the failing capacitor element. The two wires are commonly soldered to copper strips before integration into the capacitor.

Concerning the single wire, the disadvantages of this technique is that the dependence of fuse response $I^2 t$ value of the wire R diameter is proportional to $R^4$ and thus very steep. Therefore, even slight local deviations from the nominal diameter originating from necking, strong bending, stretching etc. during fuse production and handling lead to large deviations of the fuse response value. Also, the availability of copper wire with well defined diameter is limited, whence only coarse steps of fuse response values can be chosen on the steep fuse response characteristics. In addition, a single wire fuse produces a significant amount of heat caused by ohmic losses at nominal currents. The use of twisted, multistrand current leads at both ends of the fuse can partially reduce these losses.

The advantages of using two wires in parallel are that the heat losses are significantly reduced over single wire solutions and also the sensitivity to deviations of the wire diameter is reduced. However, the manufacturing is more complex, making more soldered connections necessary which adds to cost and failure risks.

Document US 2010/0224955 A1 discloses devices and methods comprising a dielectric interlayer made of materials capable of forming tensile force over a semiconductor substrate.

Moreover, a fuse metal having stronger tensile force then the first dielectric interlayer is formed over the first dielectric interlayer. Accordingly, formation of fuse residues when blowing a fuse can be prevented. Furthermore, energy and a spot size of a laser applied when blowing a fuse can be reduced. Moreover, damage to neighboring fuses can be prevented, and a fuse made of materials that are difficult to blow the fuse can be cut. Further, since polymer-series materials are used as a dielectric interlayer, the coupling effect between wiring lines can be reduced considerably.

An improved fuse element is disclosed in the not yet published European Patent Application 11182747.3. This fuse element is provided with at least one elongated recess or cut out within a self-supporting elongated fuse metal strip to provide at least two parallel metal sub-strips. In some embodiments two or more recesses positioned side by side can be provided with more than two sub-strips lying parallel side by side. However, the voltage hold-off capability of such a fuse design is limited due to the fact that not all of the fuse material along the fuse leg is disintegrated completely over the whole length of the longitudinal hole when the fuse operates. Further some of the copper which is evaporated during the fuse operates is re-deposited on the carrier material of the fuse, leading to a conduction path. Finally some of the carrier material and/or insulating oil is carbonized, leading to carbon traces on the remaining carrier material, which leads to the formation of a conducting path between the remaining end parts of the fuse. Therefor the effective isolating length is reduces by the length of these traces, which leads to a reduction of the capability to hold off voltage after fuse operation. Therefore, the at least one fusing part has to be considerably longer than necessary in order to provide a sufficiently long isolating length, leading to a proportional increase in fuse resistance, which leads to unwanted power losses and capacitor heating.

BRIEF SUMMARY OF THE INVENTION

It is object of the invention to increase the safety in such a power capacitor or a capacitor bank in comparison to the prior art. Manufacturability and handling should be improved. Tolerances as well as initial failures during fuse production should be reduced. The required fuse shape should be easily formed.

The object is solved by a power capacitor device according to the main claim and a method for fabricating the same according to the auxiliary method claim.

According to one aspect, a fuse element comprising an active fuse response part formed by at least four metal sub-strips with at least respectively two metal sub-strips being parallel, the sub-strips being provided by at least two elongated recesses within one or two self-supporting elongated fuse metal strips, with the at least two recesses being provides in serial alignment along the respective fuse metal strip.

Unexpectedly, two or more serial isolating gaps, preferably of the same total length as a single gap or recess according to the European Patent Application 11182747.3 possess better isolation strength than a single gap or recess of the same total length of isolation. Hence, the total length of the fusing part can be made shorter than a similar fuse with only a single isolation gap or recess, which reduces the fuse losses considerably according to the length reduction of the total active fuse part. The realization of such a fuse is possible due to the serial connection of the individual fuse parts (sub-strips) in a single integrated fuse element, whence the fault current flows through all fuse sub-strips simultaneously and thus leads to a simultaneous response of all fuse sub-strips. The new fuse design thus allows to build fuses with reduced power losses at else identical fuse parameter and size.

According to another aspect, a method for fabricating a fuse element is executed by the following step of providing an active fuse response part comprising providing an active fuse response part comprising at least four metal sub-strips with at least respectively two metal sub-strips being parallel, the sub-strips being provided by at least two elongated recess within one or two self-supporting elongated fuse metal strips, with the at least two recesses being provides in serial alignment along the respective fuse metal strip.

The solution results in a low resistance, low cost, easy to manufacture and reliable fuse with small tolerances by using a composite material comprising a thin polymer base layer as a reinforcement of a thin metal foil.

According to another aspect the fuse element is used for electric protecting a power capacitor device made from a plurality of capacitor sub-units, whereby each capacitor sub-unit is electrically protected by one of suchlike fuse elements internally connected in series with the capacitor sub-unit.

A continuous, wide strip of compound material made from a sandwich of a suitable low-cost polymer foil and a thin metal foil. Typically, as a polymer a material can be chosen which exhibits proven compatibility with the environment of such a capacitor sub-unit, in particular in interaction with insulating liquids used in modern capacitor devices. In particular, inexpensive polymers like polypropylene, which is a standard material as a capacitor dielectric, polyethylene, etc. only add insignificantly to the material costs but significantly reduce costs caused by handling requirements and reject rates. Further suitable base materials comprise Polyimide and similar materials which are compatible with the capacitor interior environment. In special cases, where sufficiently thick metal foils are chosen which are resistant to material stress during handling, the polymer base material can be omitted, and the fuse element consists of a pure metal construction. Suitable metals for fuses made from metals are high conductivity copper, silver, and alloys of these materials.

Additional advantages over conventional fused designs are the following. The current limitation range is reached faster, leading to less energy released during fuse operation. A more stable $I^2t$ response value of the fuse is achieved, leading to a higher reliability of the capacitor bank. The discharge energy limitation is better, resulting in less discharge energy, less damage to the capacitor internal elements, and preventing case rupture. A better enclosure between capacitor elements is possible. No interaction between failure arc and casing and no interaction between individual fuses are possible. A total capacitor loss is reduced by up to 25%. The material and labor costs of fuse manufacturing and integration are reduced by up to 50%. The capacitor noise is reduced. The mutual attraction between the active fuse leads does not lead to acoustic noise production because of the small cross section of the fuse regarding its thickness. The transverse motion, which is perpendicular to the fuse surface, can be suppressed more effectively by increasing the pressure between individual capacitor elements. An energy density is increased up to 10% by reducing the fuse thickness considerably over conventional designs. A capacitor size is reduced. A more reliable fuse operation is achieved by using four or more active parallel fuse leads. This would result in asymmetric heating from the fault current which would lead to an increase of the corresponding lead resistance, which improves the current sharing between the individual leads. Moreover, a danger of internal capacitor damage caused by too intense pressing of the capacitor and fuse elements is reduced.

According to another aspect a fuse element according to this invention can be used for electrical protecting of electrical devices on low, middle or high voltage levels.

Additional advantageous embodiments are claimed by the subclaims.

According to an embodiment the self-supporting elongated fuse metal strip can be provided by a self-supporting elongated fuse metal foil.

According to a further embodiment the self-supporting elongated fuse metal strip can be provided by a first elongated fuse metal foil which is reinforced by a dielectric material thereby forming a self-supporting compound material.

According to a further embodiment the dielectric material can be a polymer layer.

According to a further embodiment the polymer layer can be a self-supporting polymer foil.

According to a further embodiment a second elongated fuse metal foil can be deposited on a surface of the polymer layer opposite to the first elongated fuse metal foil.

According to a further embodiment the plurality of capacitor sub-units can be integrated in a housing and submerged in a cooling and insulating liquid within the housing.

According to a further embodiment the power capacitor device can be assembled in a capacitor bank and the plurality of capacitor sub-units can be electrically connected in parallel and/or in series circuits.

According to a further embodiment the self-supporting elongated fuse metal strip can be angled at one longitudinal side of the active response part of the fuse element to provide a lateral electrical connecting part and to provide a current loop which drives an arc to the other longitudinal side of the active response part of the fuse element during response, with the at least two recesses being provided in either one of the two legs of the fuse metal strip or in both legs.

According to a further embodiment an elongated fuse metal strip can be covered by a protection layer protecting against dissolving of the metal caused by the cooling and insulating liquid. The protection layer can be made of polymer material. If a single copper layer is used, only one side of the copper foil has to be protected, for example by using an about 5 μm thin layer of tin (Sn) or even thinner layers of silver or gold, respectively. This provides a protection against e.g. a capacitor oil, which tends to dissolve copper sufficiently over time to become more lossy than admissible. Also, the design mechanically fixes the fuse strips against mechanical vibrations in one direction. If mechanical vibrations in the perpendicular direction are also hindered by mechanically pressing the fuse between layers of dielectric materials, which is often the case in many capacitor designs, then mechanical vibrations caused by the magnetic field of the fuse are strongly suppressed, which leads to a considerable reduction of the noise component generated by the fuse during nominal currents particularly at higher harmonic frequencies.

According to a further embodiment the metal of the self-supporting elongated fuse metal strip can be made of aluminium (Al), silver (Ag) or copper (Cu) or high conductivity alloys of these metals.

According to a further embodiment the protection layer can be made of polymer material.

According to a further embodiment the protection layer can be made of metal which is insoluble in the insulating fluid of the capacitor.

According to a further embodiment the protection layer can be made of metal oxide or a silica $SiO_2$ layer.

According to a further embodiment each of the at least four parallel metal sub-strips can comprise at least one curved elongated edge along its length in order to have similar strain rates on both edges while their forming.

According to a further embodiment the parallel metal sub-strips of different elongated fuse metal foils can be positioned with a lateral offset to each other.

According to a further embodiment two parallel metal sub-strips can be formed by an elongated recess within a middle area of the self-supporting elongated fuse metal strip.

According to a further embodiment two parallel metal sub-strips can be formed by an elongated recess within an edge area of each elongated fuse metal foil.

The inventive method as depicted above has further embodiments as follows:

The inventive method is further characterized by providing the self-supporting elongated fuse metal strip by a self-supporting elongated fuse metal foil.

Further the inventive method teaches providing the self-supporting elongated fuse metal strip by a first elongated fuse metal foil which is reinforced by a dielectric material thereby forming a self-supporting compound material.

According to the inventive method the dielectric material being a polymer layer, with the polymer layer preferably being a self-supporting polymer foil.

In another embodiment the method is characterized by superimposing a second elongated fuse metal foil on a surface of the polymer layer opposite to the first elongated fuse metal foil.

Further the inventive method teaches the self-supporting elongated fuse metal strip (1) being angled at one longitudinal side of the active response part of the fuse element to provide a lateral electrical connecting part and to provide a current loop which drives an arc to the other longitudinal side of the active response part of the fuse element during response, with the at least two recesses being provided in either one of the two legs of the fuse metal strip or in both legs.

According to the inventive method the self-supporting elongated fuse metal strip is covered by a protection layer, with the protection layer being preferably made of polymer material or of metal oxide or silica $SiO_2$.

The metal used for building the self-supporting elongated fuse metal strip is aluminium (Al), silver (Ag) or copper (Cu).

Preferably each of the at least four parallel metal sub-strips is made with at least one curved elongated edge along its length in order to have similar strain rates on both edges while their forming.

Furthermore the parallel metal sub-strips of different elongated fuse metal foils are preferably deposited with a lateral offset to each other.

Finally according to the inventive method two parallel metal sub-strips are formed by an elongated recess within a middle area of the self-supporting elongated fuse metal strip, or are formed by an elongated recess within an edge area of each elongated fuse metal foil.

The inventive usage of the fuse element according to the invention has further embodiments as follows:

According to the inventive usage the plurality of capacitor sub-units is integrated in a housing and submerged in a cooling and insulating liquid within the housing.

Furthermore the power capacitor device can be assembled in a capacitor bank and the plurality of capacitor sub-units are electrically connected in parallel and/or in series circuits.

Additionally the self-supporting elongated fuse metal strip can be covered by a protection layer protecting against dissolving of the metal caused by the cooling and insulating liquid.

Finally the inventive usage of a fuse element according to the invention is characterized by electric protecting electrical devices on low, middle or high voltage levels.

BRIEF DESCRIPTION OF THE SEVERAL VIEWS OF THE DRAWING

The invention is described on the basis of embodiments in connection with the figures. They show:

FIG. 1 a first embodiment of a fuse element according to the invention;

FIG. 2 a second embodiment of a fuse element according to the invention;

FIG. 3 a cross section view of fuse elements according to FIGS. 1 and 2;

FIG. 4 another cross section view of fuse elements according to FIGS. 1 and 2;

FIG. 7 another embodiment of a fuse element according to the invention;

FIG. 8 another embodiment of a fuse element according to the invention;

FIG. 9 another embodiment of a fuse element according to the invention;

DESCRIPTION OF THE INVENTION

Figure 5:
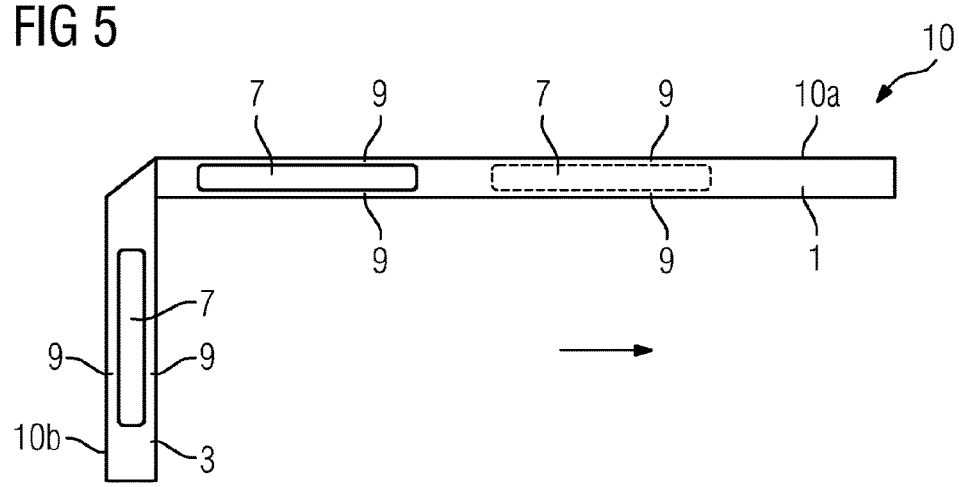
FIG. 5 another embodiment of a fuse element according to the invention.

FIG. 1 shows an embodiment of a fuse element 10 according to the invention. FIG. 1 shows two elongated recess 7 forming four parallel metal sub-strips 9 of a straight fuse strip, with respectively two sub-strips 9 being parallel to each other due to the recess between them. On an elongated dielectric base layer made of polymer material an active response part created by four parallel metal sub-strips 9 is formed. The recesses 7 are provided in a serial alignment along the fuse metal layer. The elongated fuse metal layer is deposited on one side of the dielectric base layer and one elongated recess 7 or opening is formed within the one elongated fuse metal layer. Precedent stated disadvantages of conventional double-wire solutions are overcome by the features of the present invention. Metal of the elongated fuse metal layer can be copper Cu. Alternatively aluminium (Al), silver (Ag) or alloys thereof can be used as metallic fuse material which results in several advantages. Aluminum is considerably less expensive than copper. It does not need a protective layer against dissolution by the capacitor oil. After fuse response, it is dissolved less in the capacitor oil than copper, leading to less pollution of the liquid dielectric. A disadvantage, however, is the fact that due to its oxide layer it is less suitable for soldering as a means for producing the electrical connection. FIG. 1 shows the most simple fuse structure according to this invention. FIG. 1 shows a straight strip design with two central cutouts with four parallel fuse metal sub-strips 9 in the active fuse element part. A cutout can also be denoted as opening or recess 7. An active fuse part can also be denoted as an active response part of a fuse element 10. According to the present invention, a cut metal-polymer compound material is provided. The elongated dielectric base layer made of polymer material need not be cut within the area of the recesses 7 of the elongated fuse metal layer. This improves dielectric properties of a fuse element 10. According to another alternative, the dielectric base layer is also cutout within the recesses 7 of the fuse metal layer, resulting in a simplified manufacturing process like punching. In a special realization of the invention, the polymer base layer is omitted if the metal foil is thick and strong enough to withstand manufacturing, processing and handling of the fuse element, and the fuse element consists solely of a metal foil.

FIG. 2 shows a second embodiment of a fuse element 10 according to the invention. The fuse element 10 may also contain five or more active fuse leads or sub-strips 9 as shown in FIG. 2. FIG. 2 shows in total six recesses 7, with respectively two recesses being in serial alignment. The six recesses 7 provide in total eight sub-strips 9, with respectively two being in serial alignment. All sub-strips 9 are parallel to each other.

Although, the fuse element 10 may be punched from a bare thin copper strip also, it is preferable to use a polymer film-copper foil compound material because of the increase in mechanical strength and manufacturability and improved handling properties, respectively. A copper foil with two parallel fuse sub-strips 9 already is a significant improvement over the double-wire solution, exhibiting its advantages and reducing the manufacturing costs and risks. However, during manufacturing and handling, additional risks arise caused by the fragile structure of such a fuse design. Usually, copper foils of typically 35 µm to 100 µm in thickness are suitable, with fuse strip widths typically of the order of one to two millimeters. Especially during fuse handling, integration into the capacitor sub-unit, and capacitor sub-unit integration into the housing, the danger of strong bending, wrinkling, and partial tearing of the fuse strips is high. Any such damage to the fuse would lead to a premature failure of the fuse, leading to loss of a single capacitor sub-unit and, therefore, to the loss of capacitance and energy density of the corresponding capacitor device. Also, the manufacturing of this kind of fuses is rather difficult owing to the fragility of the metallic fuse material which can be high conductivity copper foil, which is very thin and soft. In particular, punching is demanding because of these material properties, often leading to wrinkling and tearing in the most critical fuse regions, thus adding to a high reject rate. The inventive reinforcements according to FIGS. 3 and 4 result in both improvement manufacturability and handling, reducing tolerances as well as initial failures during fuse production.

FIG. 3 shows a cross sectional view of fuse elements 10 according to FIG. 1 or 2. On the top side there is an elongated fuse metal layer 1 formed by a metal foil comprising for example Cu, Al or alternative metals. Numeral 3 denotes an elongated dielectric base layer made of polymer material which can be PP, PE or other alternative polymer material.

FIG. 4 shows an alternative cross sectional view of fuse elements according to FIG. 1 or 2. Reference numeral 1 denotes a metal foil made of Cu or Al or other comparable metal. Reference numeral 3 denotes a base polymer layer and numeral 5 denotes a protecting polymer layer formed on top of a fuse metal strip 1. According to this alternative design, a second polymer layer 5 on top of the fuse metal strip 1 as an additional protection, reinforcement, and as a dissolution barrier against the capacitor oil instead of a metallic protection layer of e.g. tin on copper foils is used. Typical total length of a fuse element 10 is 200 . . . 400 mm, typical length of an active response part or cutout section or recess 7 is 50 . . . 120 mm. Typical thicknesses of metal and polymer layer depend on the application and are of the order of 25 µm to 100 µm. Typical overall widths are of the order of 5 to 25 mm, most preferably in the range of 10 mm. The width of the fuse metal strips 1 depends on the application, the number of parallel sub-strips 9, the thickness of the metallic strip 1, and the material of the metallic layer. Typical values of metal strip 1 width are in the range of 0.5 mm to 5 mm, preferably in the range of 0.8 to 2.5 mm.

FIG. 5 shows another embodiment of an internal fuse element 10 according to the invention. For integration into a capacitor device I, a straight fuse design with an elongated fuse metal strip 1 formed on an elongated dielectric base layer, especially an elongated dielectric polymer layer 3, can be used which is folded on one fuse lead side in order to provide a lateral electrical connection of one of the leads, and to provide a current loop which drives the arc to a preferred side in the case of fuse response. The preferred side in the case of fuse response according to this embodiment is the side opposite to the one fuse lead side on which the fuse element is folded. This is depicted by an arrow within FIG. 5. The fuse element 10 has two legs 10a, 10b, with each leg 10a, 10b being provided with at least one recess 7 and thus with at least two parallel sub-strips 9. Although distributed in two legs, the two recesses 7 are in serial alignment along the strip 1. As shown by the dotted lines, it is certainly possible to provide at least a third recess 7 for example in the leg 10a, thus having in total six sub-strips 9, respectively two of them being adjacent to each other. If the strip 1 respectively the legs 10a, 10b are long enough, certainly more than three recesses 7 with a growing number of sub-strips 9 con be provided.

Figure 6:
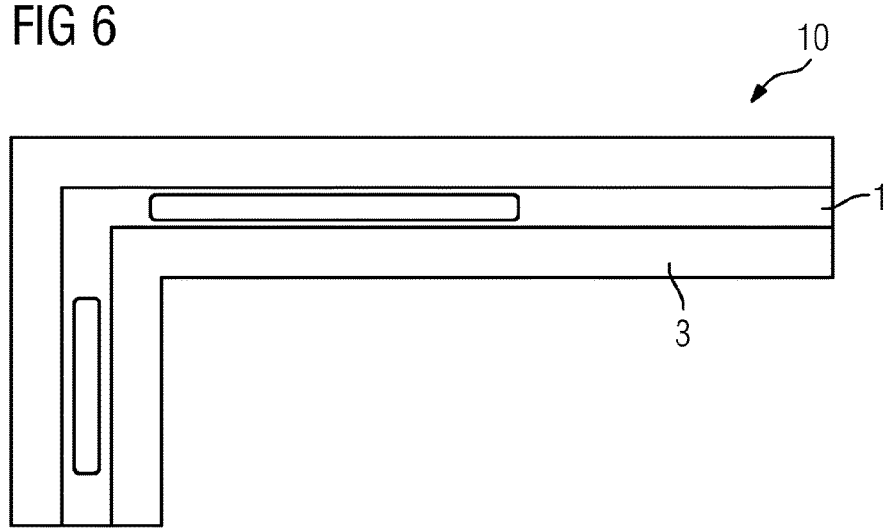
FIG. 6 another embodiment of a fuse element according to the invention.

FIG. 6 shows another embodiment of an internal fuse element 10 according to the present invention. Here, according to an alternative to FIG. 5 an angled fuse element can be directly cut or punched from a compound foil. This design also can be called bent fuse design. According to this embodiment, a version is shown where the elongated dielectric polymer layer 3, which can be provided by a polymer film, laterally extends over the metallic part, which is the metal strip 1, for example for insulating purposes. According to a more cost-effective solution, such a polymer film extension is not used.

FIG. 7 shows another embodiment according to the present invention whereby an elongated dielectric polymer layer 3, which can be a polymer base material, is used which has metallic layers on both sides. Hence, the total resistance and losses are reduced even if merely four fuse sub-strips 9 are used, which are formed two on each side of the polymer layer 3 by respective side-recesses 7. This means additionally it is suitable for further reduction of the fuse losses to use double-sided foils for example copper-clad polymer foils using at least two sub-strips 9 on each side, with respective two sub-strips 9 being parallel to each other. FIG. 7 shows a so-called double-sided fuse design whereby two of elongated fuse metal strips 1 are deposited on each other on opposite sides of the dielectric base layer, which can be a dielectric polymer layer 3. FIG. 7 shows a polymer layer 3 being provided by a polymer film or foil laterally extending over a metalized area.

FIG. 8 shows another embodiment of a fuse element 10 according to the present invention. This embodiment is similar to the embodiment according to FIG. 7 with the difference that an extension of the polymer foil according to FIG. 7 is not provided. This is more cost-effective. Moreover, FIG. 8 shows that the elongated dielectric foil is not cut within the recesses 7 within the one elongated fuse metal strip 1. According to the embodiment of FIG. 8, two parallel sub-strips 9 are deposited on each other on opposite sides of the dielectric foil, with a total of four sub-strips 9.

FIG. 9 shows another embodiment of an internal fuse element according to the present invention. This embodiment is similar to the embodiment of FIG. 7 but is different in the fact, that two parallel sub-strips 9 within the elongated fuse metal strips 1 are deposited on opposite sides of the dielectric polymer layer 3, which especially is a polymer foil, but comprise a lateral offset in respect to each other. Thus, each sub-strip 9 is formed by one elongated recess 7 within opposite edge areas of each elongated fuse metal strip 1. This means fuse sub-strips 9 can be either facing each other as shown according to FIGS. 7 and 8, or can be offset against one another as shown in FIG. 9. FIG. 9 shows a double-sided fuse design with mutually offset fuse sub-strips 9. Again each leg of the angled fuse element is provided with a sub-strip, so again in total four sub-strips 9 with respective two being parallel to another are provided.

Figure 10:
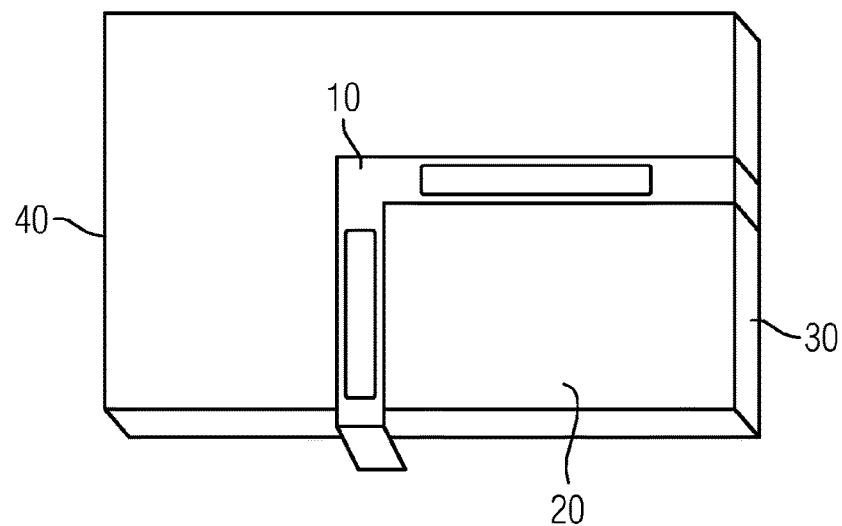
FIG. 10 an embodiment of capacitor sub-unit according to the invention.

FIG. 10 shows an embodiment of a capacitor sub-unit being electrically protected by an internal fuse element according to this invention. Numeral 10 denotes an internal fuse element according to the present invention being electrically connected in series with a capacitor sub-unit 20 comprising a top metallization terminal 30. As can be seen, the internal fuse element 10 is a flat structure comprising an angled embodiment, the structure easily can be electrically and mechanically connected with the capacitor sub-unit 20. The capacitor sub-unit 20 preferably can be provided as a sleeve capacitor comprising a top metallization terminal 30 and a bottom terminal metallization 40. FIG. 10 shows an advantageous way of electrically connecting an internal fuse element 10 according to the present invention in series to its allocated capacitor sub-unit 20.

Figure 11:
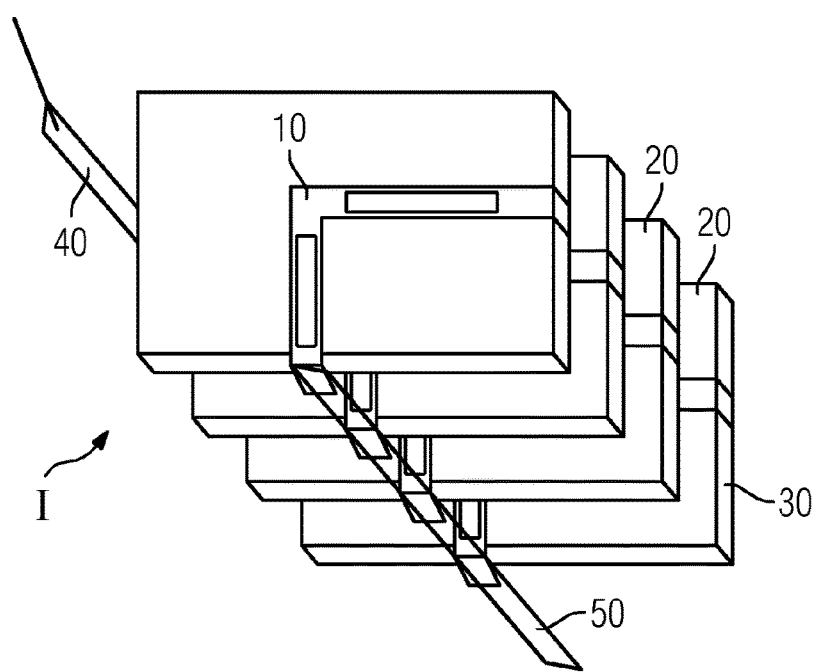
FIG. 11 an embodiment of a plurality of capacitor sub-units according to the invention.

FIG. 11 shows an embodiment of a power capacitor device I according to the present invention. The power capacitor device I comprises a plurality of capacitor sub-units 20 each being electrically protected by one elongated internal fuse element 10 connected in series with the capacitor sub-unit 20 to be protected. According to this embodiment four capacitor sub-units 20 are electrically connected parallel to each other by using a bottom common terminal 40 and a common terminal 50 to each of four internal fuse elements 10. This power capacitor device I can be assembled within a capacitor bank.

FIG. 11 shows the integration of internal fuse elements 10 within a power capacitor device I and additionally a three dimensional composition of a capacitor sub-unit 20 stack within power capacitor device I, whereby within such a stack several individual condenser sub-units 20 are electrically connected parallel and several of suchlike stacks are electrically connected in series to reach the necessary voltage level.

Figure 12:
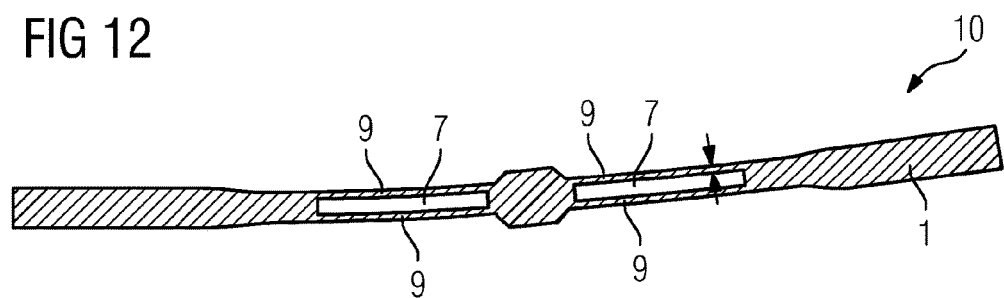
FIG. 12 another embodiment of a fuse element according to the invention.

FIG. 12 shows another embodiment of an internal fuse element 10 comprising an elongated fuse metal strip 1 on an elongated dielectric base layer, comprising two recesses 7 forming respective two sub-strips 9, whereby mechanical punching or cutting from a narrow compound material strip is used as the mature manufacturing step, whereby the central active part of the internal fuse element 10 is tailored in order to have similar strain rates on both sides of the strips while punching which is depicted by the two narrows within FIG. 11. This increases precision and decreases failure and reject rates. Accordingly, each of the respective two parallel sub-strips 9 comprises at least one curved elongated edge along a length of the sub-strip 9 in order to have similar strain rates on both edges of each sub-strip 9 while forming of the recess 7 especially by mechanical punching.

Figure 13:
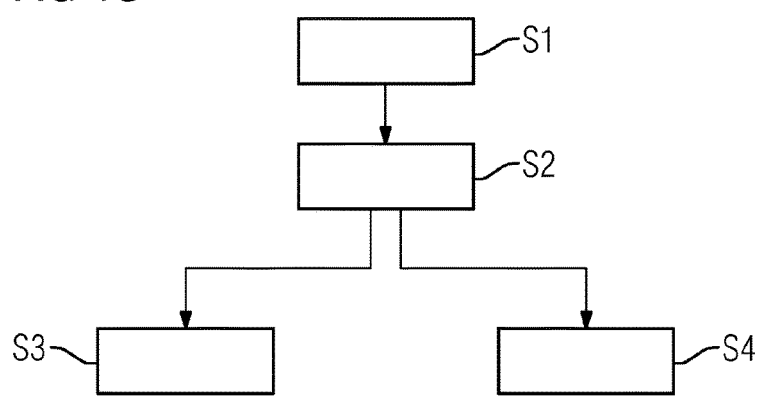
FIG. 13 an embodiment of a method according to the invention.

FIG. 13 shows an embodiment of a method according to the present invention. Accordingly, this method is for fabricating a power capacitor device made from a plurality of capacitor sub-units, whereby each capacitor sub-unit is electrically protected by an internal fuse element connected in series with the capacitor sub-unit, whereby each fuse element can be manufactured by the following steps. According to a first step S1 an elongated dielectric base foil made of polymer material is provided. According to a second step S2 an active response part formed by at least four sub-strips with at least respectively two metal sub-strips being parallel is provided on the elongated dielectric base foil. There are two alternatives for providing the sub-strips. According to a first alternative by a step S3, the sub-strips are formed by providing at least two elongated recesses within merely one elongated fuse metal strip, whereby the metal strip is deposited on one side of the dielectric base polymer foil. According to a second alternative by a step S4, the sub-strips are formed by providing at least one elongated recess within one elongated fuse metal strip, whereby two of suchlike elongated fuse metal strips are deposited on each other on opposite sides of the dielectric base polymer foil.

The reinforcement results in both improved manufacturability and handling, reducing tolerances as well as initial failures during fuse production. Using self-supporting fuse metal strips or reinforced fuse metal strips allows to easily cut the required fuse shape from a continuous sheet of the fuse material, which can be a compound material, either by stamping, punching, laser cutting, water jet cutting, milling or other suitable technologies. Also, it is possible to chemically, for example liquid or plasma-chemically, etch the required fuse shape and simply cut the periphery of the fuse either before or after shaping the metallic fuse element. The resulting fuse geometry can be similar to the known punched copper foil type, but can be improved to use different number of individual fuse strips as indicated in the drawings. Fuses made from such a compound material are much less sensitive in regard of being damaged during manufacturing, handling, and integration than any other fuse design according to the state of the art. A simple mechanical punching process can be realized more cost-effectively than in the most simple design which uses a bare copper strip. The inventive design can significantly reduce the overall manufacturing and handling costs over the conventional state of the art by typically 50%. Further technologies suitable for manufacturing this new kind of fuses according to the present invention include, but are not limited to, milling the fuse contours from a stack of raw strips, printing, painting the fuse contours with conductive paint, chemical etching of the copper foil, chemical and/or plasma aided deposition of conducting layers on polymer film. Suitable manufacturing methods may also comprise: punching from narrow strip material using a hold down; milling the recess simultaneously in a stack of unmanufactured pre-cut strips; punching the cutout or recess from wide strip material in a first sub-step, cutting lengthwise in a second sub-step; laser cutting; water jet cutting of a stack of uncut strips or raw parts; cutting/punching the raw part, etching like wet chemical, galvanic, plasma chemical etching of the cutout in the metallic layer only; cutting/punching the cutout in a metal foil from roll material before gluing it to the polymer layer or layers; and similar methods used for mass production of thin precision parts.

A power capacitor device I and a method for manufacturing the same, are provided whereby the power capacitor device I is made from a plurality of capacitor sub-units 20, protected by internal fuse elements 10, each fuse element comprising an elongated dielectric base layer 3 made of polymer material whereby an active response part is formed by at least four strips 9 of metal with at least respectively two metal sub-strips 9 being parallel for example being advantageously formed on top of the elongated dielectric base layer 3. Accordingly, performance of such a power capacitor device I can be increased and manufacturing costs can be decreased. The invention especially can be applied to a plurality of capacitor sub-units being integrated in a housing and submerged in a cooling and insulating liquid within the housing.

A power capacitor device I and a method for manufacturing the same, are provided whereby the power capacitor device I is made from a plurality of capacitor sub-units 20, protected by internal fuse elements 10, each fuse element consisting of an active response part which is advantageously formed by at least four metal sub-strips 9 of an elongated fuse metal foil with at least respectively two metal sub-strips 9 being parallel including leading and trailing parts for electrical connection of each fuse element 10, the elongated fuse metal foil being reinforced by an elongated dielectric polymer layer 3 made of polymer material. Accordingly, performance of such a power capacitor device I can be increased and manufacturing costs can be decreased. The invention especially can be applied to a plurality of capacitor sub-units being integrated in housings and submerged in a cooling and insulating liquid within the housing.

The invention claimed is:

1. A fuse element, comprising:
an active fuse response part containing at least one self-supporting elongated fuse metal strip having at least four metal sub-strips with at least two of said metal sub-strips being parallel metal sub-strips, said self-supporting elongated fuse metal strip having at least two elongated recesses formed therein, said at least two recesses disposed in serial alignment along said self-supporting elongated fuse metal strip, said self-supporting elongated fuse metal strip formed as a self-supporting elongated fuse metal foil or having a first elongated fuse metal foil being reinforced by a self-supporting dielectric polymer foil thereby forming a self-supporting compound material; and
said self-supporting elongated fuse metal strip having two legs and being angled at one longitudinal side of said active response part of the fuse element to provide a lateral electrical connecting part and to provide a current loop which drives an arc to the other longitudinal side of said active response part of the fuse element during response, with said at least two recesses being provided in either one of said two legs of said self-supporting elongated fuse metal strip or in both of said legs.

2. The fuse element according to claim 1, further comprising a second elongated fuse metal foil deposited on a surface of said self-supporting dielectric polymer foil opposite to said first elongated fuse metal foil.

3. The fuse element according to claim 2, wherein said parallel metal sub-strips of different elongated fuse metal foils are deposited with a lateral offset to each other.

4. The fuse element according to claim 2, wherein said two parallel metal sub-strips are formed by one of said elongated recesses within an edge area of said self-supporting elongated fuse metal foil.

5. The fuse element according to claim 1, further comprising a protection layer covering said self-supporting elongated fuse metal strip.

6. . The fuse element according to claim 5, wherein said protection layer is made of a polymer material.

7. The fuse element according to claim 5, wherein said protection layer is made of metal oxide or a silica $SiO_2$ layer.

8. The fuse element according to claim 1, wherein said self-supporting elongated fuse metal strip is made of a metal selected from the group consisting of aluminum, silver and copper.

9. The fuse element according to claim 1, wherein said two parallel metal sub-strips are formed by one of said elongated recesses within a middle area of said self-supporting elongated fuse metal strip.

10. A fuse element, comprising:
an active fuse response part containing at least one self-supporting elongated fuse metal strip having at least four metal sub-strips with at least two of said metal sub-strips being parallel metal sub-strips, said self-supporting elongated fuse metal strip having at least two elongated recesses formed therein, said at least two recesses disposed in serial alignment along said self-supporting elongated fuse metal strip, said self-supporting elongated fuse metal strip formed as a self-supporting elongated fuse metal foil or having a first elongated fuse metal foil being reinforced by a self-supporting dielectric polymer foil thereby forming a self-supporting compound material; and
said at least four metal sub-strips are at least four parallel metal sub-strips and each of said at least four parallel metal sub-strips have edges, a length and at least one curved elongated edge along said length in order to have similar strain rates on both of said edges during their forming.

11. A method of protecting a power capacitor device, which comprises the steps of:
providing a plurality of fuse elements, each of the fuse elements containing an active fuse response part containing at least one self-supporting elongated fuse metal strip having at least four metal sub-strips with at least two of the metal sub-strips being parallel metal sub-strips, the self-supporting elongated fuse metal strip having at least two elongated recesses formed therein, the at least two recesses disposed in serial alignment along the self-supporting elongated fuse metal strip, the self-supporting elongated fuse metal strip formed as a self-supporting elongated fuse metal foil or having a first elongated fuse metal foil being reinforced by a self-supporting dielectric polymer foil thereby forming a self-supporting compound material; and
electrically protecting a power capacitor device made from a plurality of capacitor sub-units, whereby each of the capacitor sub-units is electrically protected by one of the fuse elements being internally connected in series with a capacitor sub-unit.

* * * * *